(12) United States Patent
Nishimoto et al.

(10) Patent No.: US 6,538,221 B1
(45) Date of Patent: Mar. 25, 2003

(54) KEY GUARD FOR A FUNCTION KEY ON A BICYCLE CONTROL PANEL

(75) Inventors: Naohiro Nishimoto, Hashimoto (JP); Takuji Masui, Sakai (JP)

(73) Assignee: Shimano Inc. (JP)

( * ) Notice: Subject to any disclaimer, the term of this patent is extended or adjusted under 35 U.S.C. 154(b) by 45 days.

(21) Appl. No.: 09/661,972

(22) Filed: Sep. 14, 2000

(51) Int. Cl.⁷ ................................................ H01H 9/00
(52) U.S. Cl. .................................... 200/334; 200/61.85
(58) Field of Search ................... 200/5 R, 18, 61.27, 200/61.54, 61.55, 61.57, 61.85, 61.87, 293, 294, 304, 329, 332.1, 332.2, 334

(56) References Cited

U.S. PATENT DOCUMENTS

| | | | | |
|---|---|---|---|---|
| 4,565,909 A | * | 1/1986 | Yashima et al. | 200/61.85 |
| 4,636,769 A | | 1/1987 | Tsuyama | 340/134 |
| 5,150,913 A | * | 9/1992 | Hoelzl | 200/302.2 |
| 5,308,419 A | | 5/1994 | Sakurai | 156/73.1 |
| 5,610,378 A | * | 3/1997 | DuRocher et al. | 200/61.54 |
| 5,614,701 A | * | 3/1997 | Hung | 200/61.85 |
| 5,625,336 A | | 4/1997 | Yamamoto | 340/432 |
| 5,747,759 A | * | 5/1998 | Lochmahr et al. | 200/5 R |
| 6,069,788 A | | 5/2000 | Masui | 361/683 |
| 6,227,068 B1 | * | 5/2001 | Masui et al. | 200/61.85 |

FOREIGN PATENT DOCUMENTS

JP          5-262276          10/1993          ......... B62M/25/08

* cited by examiner

*Primary Examiner*—Michael Friedhofer
(74) *Attorney, Agent, or Firm*—Jeffer, Mangels, Butler & Marmaro LLP

(57) ABSTRACT

A key guard is disclosed for protecting a corresponding function key on a bicycle control panel, wherein the key guard does not freely move upon impact. The key guard is a protrusion attached to and extending from the base of the control panel adjacent to the corresponding function key. The top edge of the key guard extends above the top surface of the corresponding function key and the key guard, at least partially, surrounds the periphery of the corresponding function key. The key guard may slope toward the center of the function key. Alternatively, the key guard includes one or more posts surrounding the corresponding function key.

11 Claims, 5 Drawing Sheets

KEY GUARD FOR A FUNCTION KEY ON A BICYCLE CONTROL PANEL

FIELD OF THE INVENTION

The present invention relates generally to a bicycle control panel, and more particularly to a key guard to protect a corresponding function key on a bicycle control panel from damage.

BACKGROUND OF THE INVENTION

Modern bicycles allow the rider to control the gears, the brakes and other features of the bicycle to optimize the rider's experience. Much of the control functions are computerized so that a rider can control the particular function by simply pressing a switch on a control panel. Additionally, indicators are provided on the control panel for conveying information to the rider about the status of various bicycle functions, such as speed and distance traveled. A typical computerized control panel includes a base member mounted to the bicycle handlebar and numerous keys on the control panel, each key corresponding to a particular function that is controllable by the rider. The term key is used herein to include any buttons, switches, indicators or other devices that either initiate an operation when activated or transmit information to the rider regarding the state of an operation.

Keys on the control panel are generally made of a soft, malleable material, such as resin. Because of the soft material, the keys on the control panel are susceptible to damage if struck by any material that is harder than the key material. For instance, if a bicycle is dropped such that a key on the control panel collides with the ground, the key can be scratched and defaced. The marring of the external appearance of the key is especially undesirable for indicators that visually provide information to the bicycle rider. Indicators are generally made of clear resin to facilitate the viewing of information provided by the control panel to the bicycle rider. Even the slightest damage to an indicator may prohibit the rider from clearly viewing the information provided by the indicator.

The keys of the control panel are especially susceptible to damage in the manufacturing process. During the process of assembling the bicycle at the factory, workers need to be particularly careful not to damage the fragile keys. If a bicycle is dropped from the assembly line, or if an object strikes the keys and causes damage to the keys, the bicycle is taken off of the assembly line. The keys will have to be reworked or replaced, and the bicycle control panel must be reassembled. This process consumes time and labor resources.

The keys of the control panel can also be damaged by the bicycle owner. It is not uncommon to repair a bicycle by turning it upside down and balancing the seat of the bicycle and the handlebars on the pavement. If, during the repair, the keys of the control panel come in contact with pavement, gravel or other hard objects, the keys could be damaged.

The possibility of damaging the keys are not limited to the above scenarios. Rather, the keys can be damaged by any number of objects coming into contact with the surface of the keys. Accordingly, it is desirable to provide a key guard that would prevent a key from getting scratched or otherwise damaged.

It is known to provide a lid for the control panel that is hingably attached thereto, to protect the surface of the control panel from damage. However, the lid is inconvenient for a bicycle rider who does not wish to open the lid each time he wants access to the keys on the control panel. Accordingly, there is a need for a key guard that protects the key while allowing easy access to the keys of the control panel.

It is also desirable to provide a key guard that is simple and inexpensive to manufacture.

SUMMARY OF THE PREFERRED EMBODIMENTS

The present invention overcomes the aforementioned problems by providing a key guard corresponding to a particular function key on a bicycle control panel, wherein the key guard prevents the function key from getting damaged.

In the preferred embodiment of the invention, the key guard is a protrusion attached to and extending from the base of the control panel. The key guard is preferably located adjacent to the corresponding function key. The key guard is positioned such that, if the control panel is struck by an object, the key guard absorbs the impact, rather than the function key. In one embodiment of the invention, the top edge of the key guard extends above the top surface of the corresponding function key.

In a preferred embodiment of the invention, the key guard surrounds the periphery of the corresponding function key. The key guard preferably does not completely surround the function key, leaving an opening through which a rider can easily access the function key. To further facilitate the access to the function key, the key guard preferably slopes downward as it approaches the center of the function key.

In another embodiment, the key guard includes a post located in close proximity to the function key, dimensioned such that, upon impact, the post absorbs the impact rather than the function key. In yet another preferred embodiment of the invention, the key guard includes two posts, diagonally positioned around the function key. In a more preferred embodiment of the invention, the key guard includes four posts, surrounding the corresponding function key in a manner that defines a rectangular key guard.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
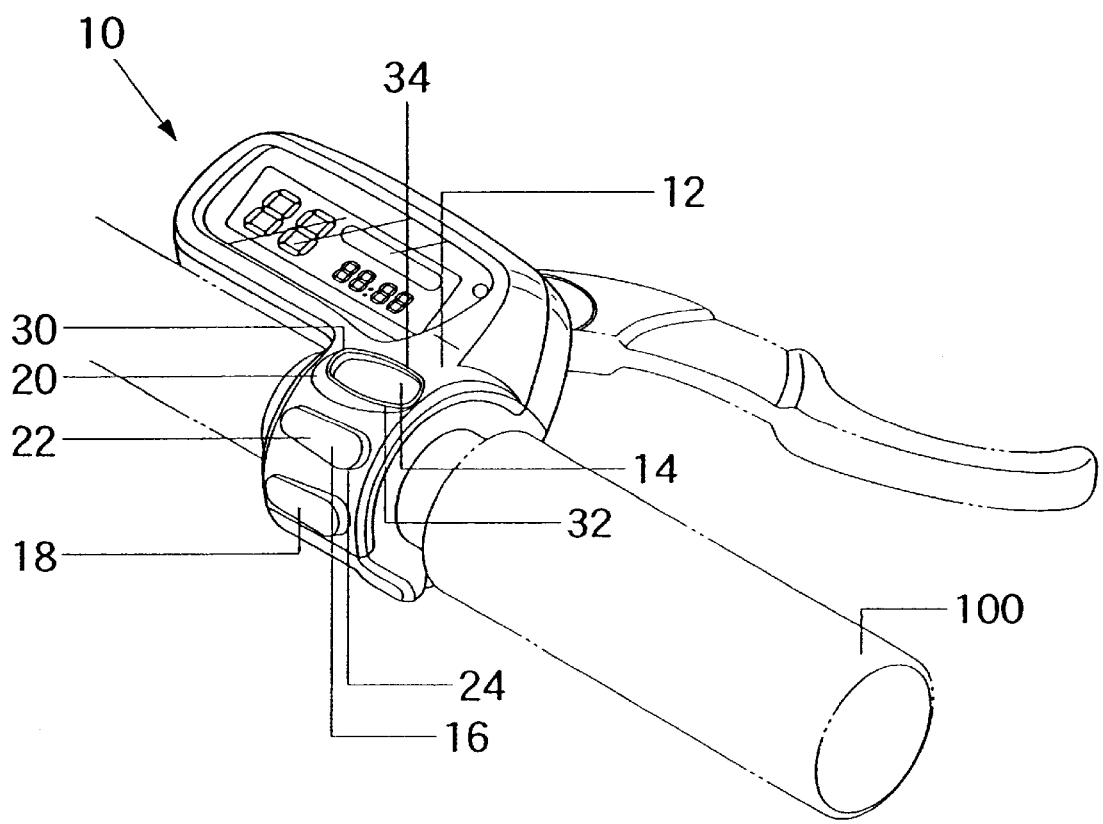
FIG. 1 is a perspective view of an embodiment of the bicycle control panel of the present invention installed on a bicycle handlebar, wherein the bicycle control panel includes a key guard corresponding to a function key on the control panel.
Figure 2:
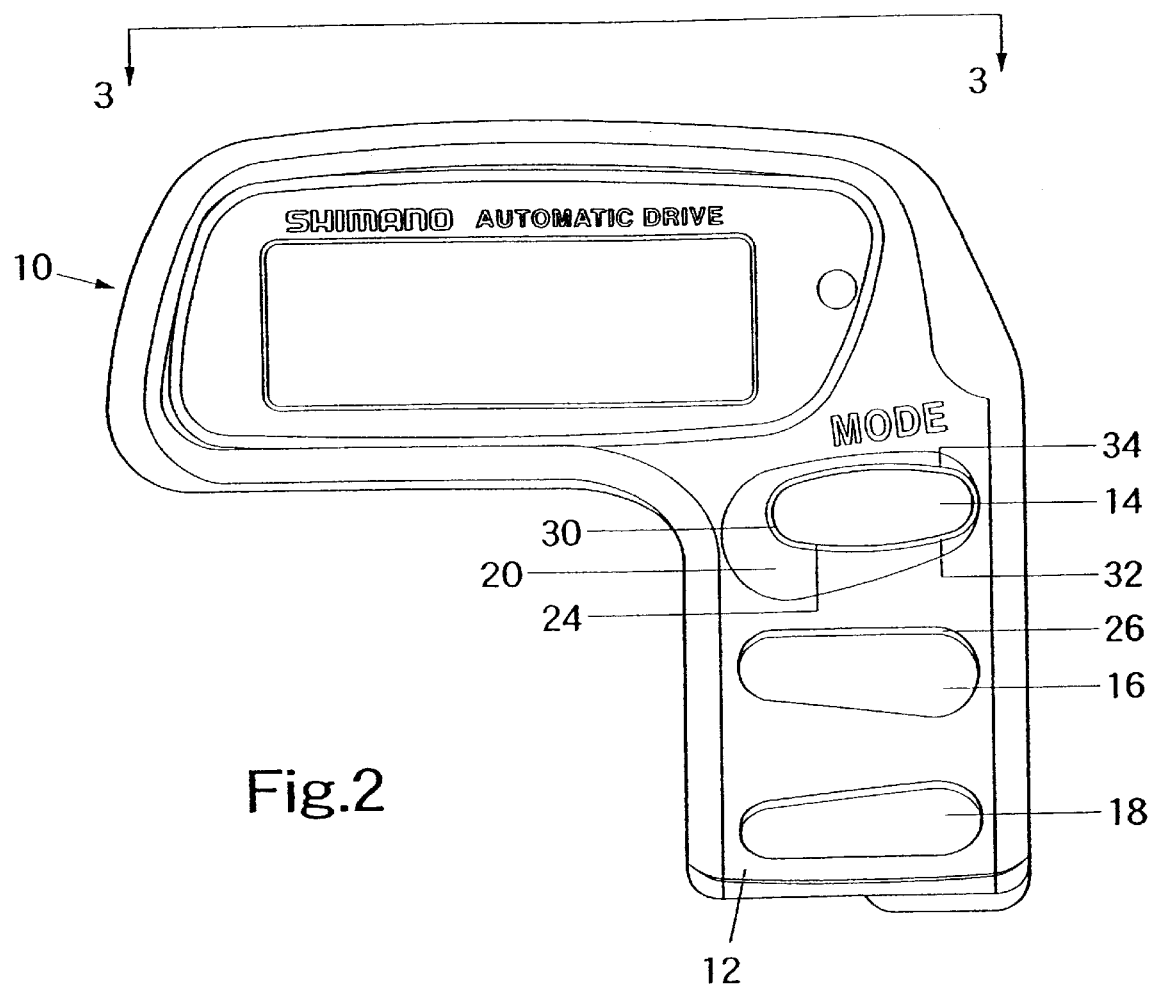
FIG. 2 is a plan view of an embodiment of the bicycle control panel of the present invention having a key guard corresponding to a function key on the control panel.
Figure 3:
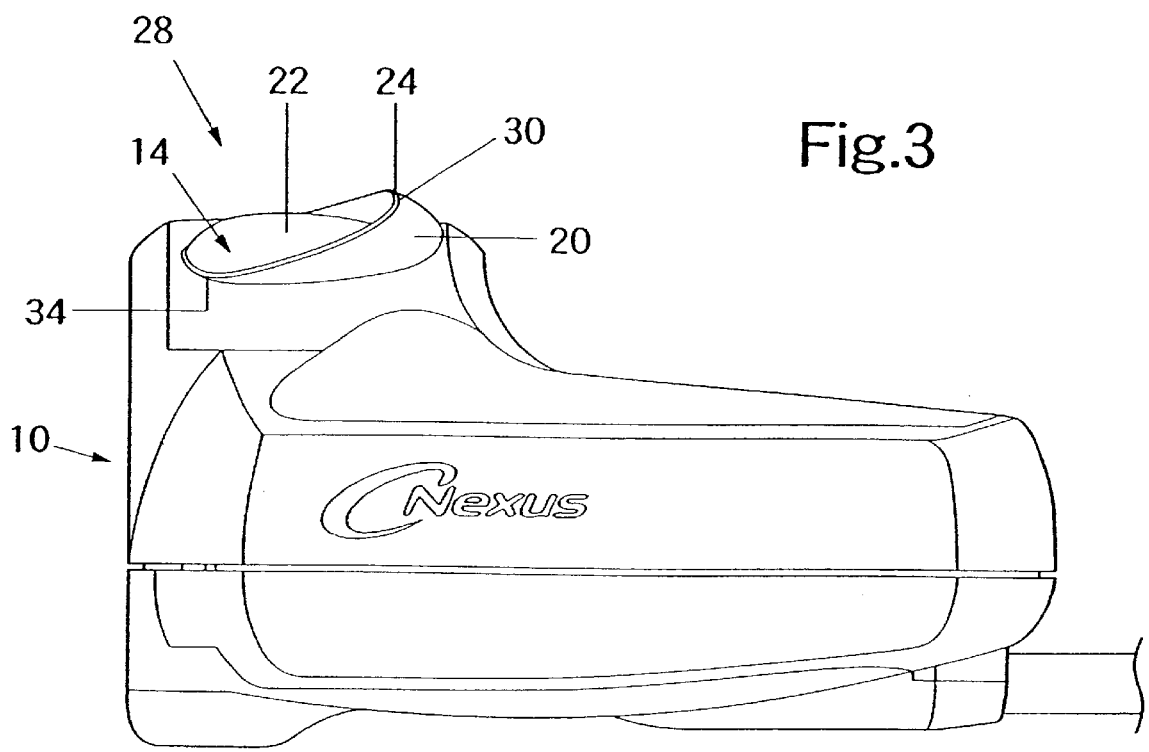
FIG. 3 is a side view of the bicycle control panel shown in FIG. 2, taken along line 3—3.

An exemplary embodiment of a bicycle control panel according to the principles of the present invention is illustrated in FIGS. 1 through 3 and identified by reference numeral 10. As shown in FIGS. 1 through 3, in one embodiment of the invention, a bicycle control panel includes a control panel base 12, a plurality of function keys 14, 16, 18 and a key guard 20 corresponding to a particular key 14. Function keys are used herein to include buttons, switches, indicators or any other device that either initiates an operation when activated or transmits information to the rider regarding the state of an operation. As shown in FIG. 1, the bicycle control panel 10 can be installed on a bicycle handlebar 100 at a location that would enable a rider to access the keys on the control panel easily.

The top surface 22 of the function keys 14, 16, 18 can either protrude from the control panel base 12 or, alternatively, the top surface 22 of the function keys can be level with the control panel base 12. In the preferred embodiment of the invention, the key guard 20 is a protrusion attached to and extending from the base 12 of the control panel 10. The key guard 20 is preferably located adjacent to the corresponding function key 14. The key guard is positioned such that, if the an object is aimed to strike the corresponding function key 14, the key guard 20 absorbs the impact, rather than the function key 14. In one embodiment of the invention, as best shown in FIG. 3, the top edge 24 of the key guard 20 extends above the top surface 22 of the corresponding function key 14. If an object is dropped on the function key from above, it will first strike the top edge 24 of the key guard 20, which will absorb most, if not all, of the impact. Similarly, if the bicycle drops on the ground, the top edge 24 of the key guard 20 will hit the floor, or other hard object, first, protecting the top surface 22 of the corresponding function key 14 from direct impact.

In a preferred embodiment of the invention, the key guard 20 surrounds the periphery or perimeter 26 of the corresponding function key 14. In one embodiment of the invention (not shown), the key guard 20 completely surrounds the function key 14. In this embodiment, although the protection of the function key is maximized, the rider has limited access to the function key 14 and will be required to squeeze his fingers through the key guard 20 to access the function key 14. In a preferred embodiment of the invention, the key guard 20 does not completely surround the function key 14, leaving an opening 28 through which a rider can easily access the function key.

In the embodiment depicted in FIGS. 1 through 3, the key guard 20 preferably has a center portion 30. The center portion 30 is preferably located at point farthest away from the location of a rider's hand on the handlebar. To facilitate the access to the function key 14, the key guard 20 preferably slopes downward from the center 30 of the key guard 20 as it approaches the ends 32, 34 of the key guard. This allows a rider's thumb to easily slide between the ends 32, 34 of the key guard 20 to access the function key 14. The sloped edge 24 will also deflect the path of motion of an object that is aimed to contact the function key 14 from above.

Figure 4:
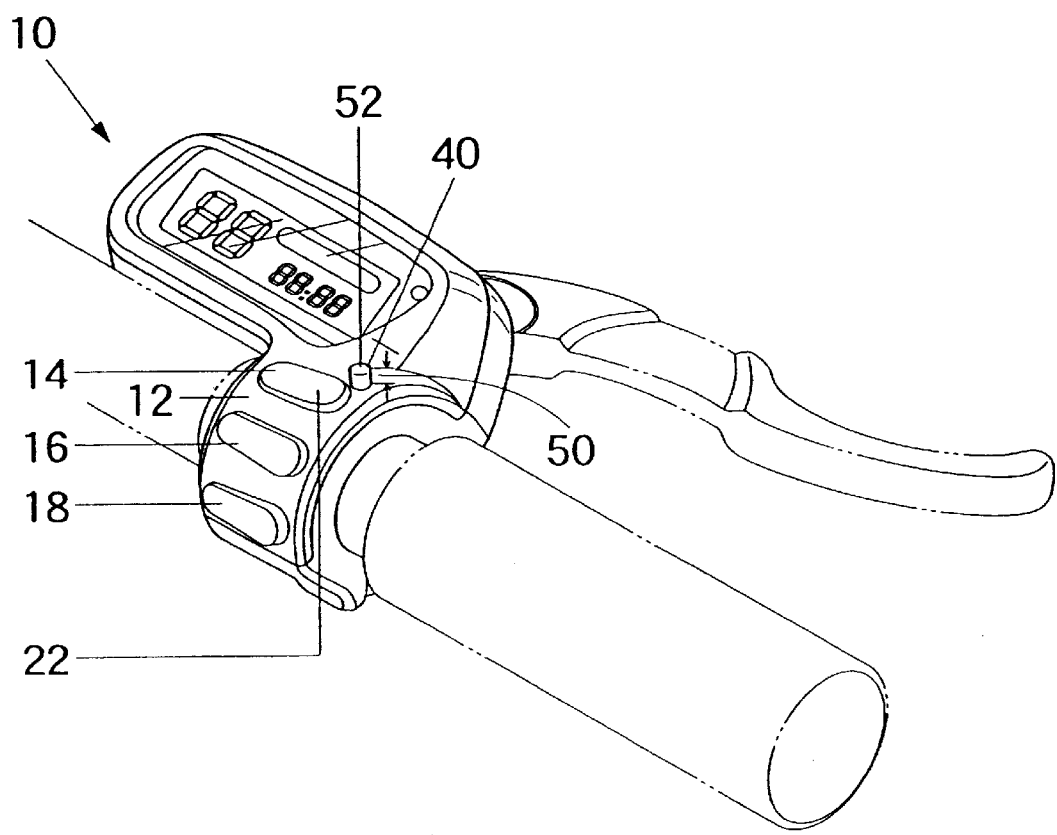
FIG. 4 is a perspective view of another embodiment of the bicycle control panel of the present invention wherein the key guard includes a post adjacent to the function key.

In another embodiment of the present invention, as shown in FIG. 4, the key guard 20 includes a post 40 located in close proximity to the corresponding function key 14. The post 40 is dimensioned such that, upon impact, the post 40 absorbs the impact rather than the function key 14. In the embodiment shown, the post 40 is cylindrical. The invention, however, does not limit the post 40 to a cylindrical shape. Rather, the post can be dome-shaped, oval, rectangular, cubical or any other desired shape. The post 40 is preferably rigidly fixed to the base 12 of the control panel 10. In the preferred embodiment of the invention, the post 40 is made of a resistive material that will absorb the impact of a hard object without failing and without substantially moving upon impact.

The post 40 is preferably located in the upper right hand corner of the function key 14 to protect the key from impact from above. In the preferred embodiment, the height 50 of the post 40 extends above the top surface 22 of the function key 14. Accordingly, an object striking from above, will strike the top 52 of the post 40 before striking the function key, itself.

Figure 5:
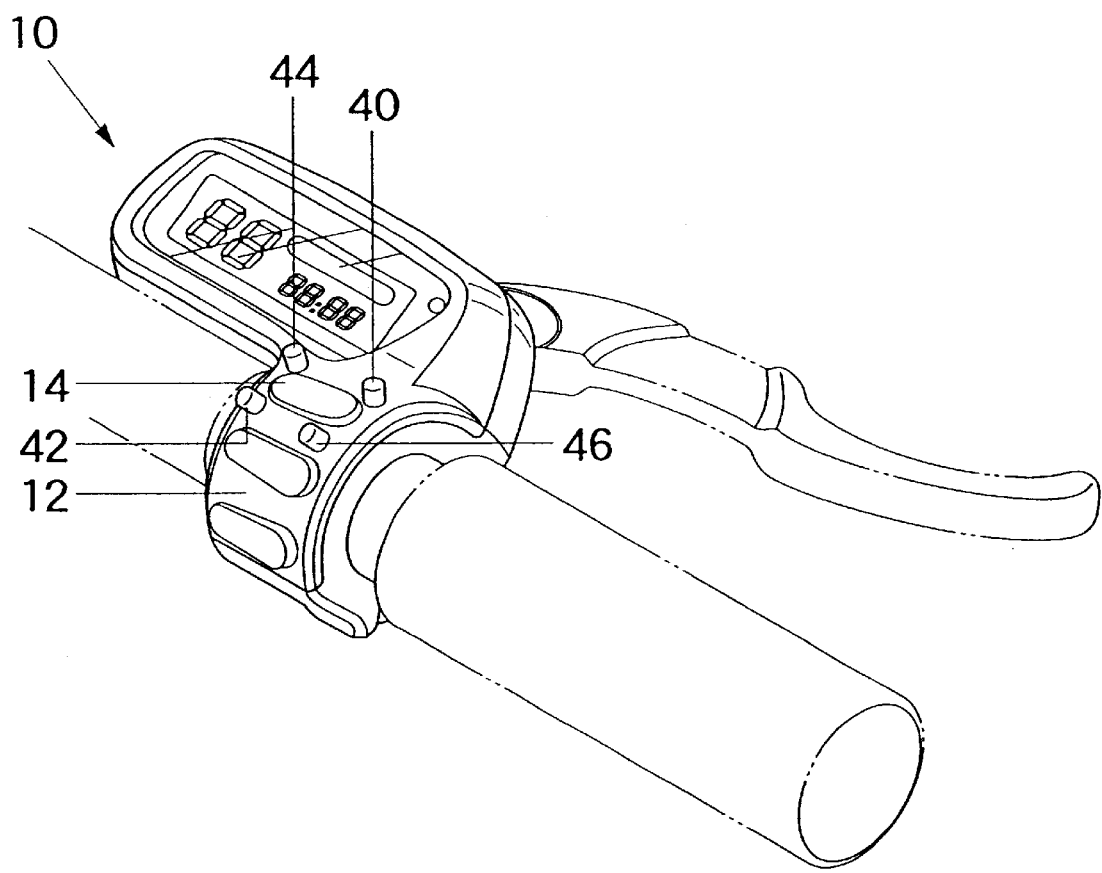
FIG. 5 is a perspective view of another embodiment of the bicycle control panel of the present invention wherein the key guard includes four posts positioned around the function key to define a rectangular key guard.

In another preferred embodiment of the invention, the key guard includes two posts 40 and 42, diagonally positioned around the function key. The posts are preferably rigidly attached to the base 12 of the control panel 10 and are preferably made of a material that will absorb the impact of a hard object. In a more preferred embodiment of the invention, as shown in FIG. 5, the key guard includes four posts 40, 42, 44, 46 surrounding the corresponding function key 14 in a manner that defines a rectangular key guard. Each post 40, 42, 44, and 46, preferably has a top 52 that extends above the top surface 22 of the function key 14. The four posts together protect the function key from impact from above and from the sides.

What is claimed is:

1. A bicycle control panel, comprising:
   a key for performing a function, the key having a periphery; and
   a guard adjacent to the key, wherein the guard does not freely move upon impact, and wherein the guard comprises at least two protrusions.

2. A bicycle control panel, comprising:
   a key for performing a function, the key having a periphery and a center; and
   a guard adjacent to the key, wherein the guard partially tracks the periphery of the key, tapers toward the center of the key and does not freely move upon impact.

3. A bicycle control panel, comprising:
   a control panel base;
   at least one function key positioned on the control panel base; and
   a key guard associated with a particular function key of the at least one function key, the particular function key having a perimeter, the key guard extending from the control panel base and partially surrounding the perimeter of the particular function key, wherein key guard has a first height and a second height, and wherein the key guard tapers from the first height to the second height.

4. A bicycle control panel in accordance with claim 3 wherein the particular function key comprises a switch.

5. A bicycle control panel in accordance with claim 3 wherein the particular function key comprises an indicator.

6. A bicycle control panel, comprising:

a control panel base;

at least one function key positioned on the control panel base; and a key guard associated with a particular function key of the at least one function key, the particular function key having a top surface;

wherein the key guard further comprises a first substantially rigid post and a second substantially rigid post adjacent the particular function key in a diagonal relationship to the first post, the first and second posts each having a first end attached to the control panel base and a second end extending above the top surface of the particular function key.

7. A bicycle control panel in accordance with claim 6 wherein the key guard further comprises a third and a fourth substantially rigid post, each of the first, second, third and fourth posts adjacent the particular function key, each of the first, second, third and fourth posts having a first end attached to the control panel base and a second end extending above the top surface of the particular function key.

8. A bicycle control panel in accordance with claim 7 wherein the first, second, third and fourth posts are positioned to define a rectangular key guard.

9. A control panel, comprising:

a key having a diameter; and a protrusion adjacent the key and extending above the key, wherein the protrusion has a diameter that is smaller than the diameter of the key.

10. A control panel in accordance with claim 9 wherein the protrusion comprises a post.

11. A bicycle control panel, comprising:

a key for performing a function, the key having a periphery; and a guard partially surrounding the key, wherein the guard defines a cut out portion along the periphery of the key, the cut out portion dimensioned to allow access to the key.

* * * * *